United States Patent [19]

Sato

[11] Patent Number: 5,028,039
[45] Date of Patent: Jul. 2, 1991

[54] VIBRATION DAMPING DEVICE

[75] Inventor: Shigeki Sato, Kanagawa, Japan

[73] Assignee: Nissan Motor Company, Ltd., Japan

[21] Appl. No.: 494,951

[22] Filed: Mar. 15, 1990

Related U.S. Application Data

[63] Continuation of Ser. No. 266,061, Nov. 2, 1988, abandoned.

[30] Foreign Application Priority Data

Nov. 4, 1987 [JP] Japan .................. 62-168608[U]

[51] Int. Cl.$^5$ .............................................. F16F 15/03
[52] U.S. Cl. ................. 267/140.1; 180/312;
248/550; 248/562; 248/636
[58] Field of Search ............. 267/140.1 AE, 140.1 R,
267/219; 180/300, 312, 902; 248/550, 562, 636

[56] References Cited

U.S. PATENT DOCUMENTS

| | | |
|---|---|---|
| 3,599,428 | 8/1971 | Chaney . |
| 4,671,227 | 6/1987 | Hollerwerger . |
| 4,685,698 | 8/1987 | Klinkner .................. 188/299 X |
| 4,720,087 | 1/1988 | Duclos . |
| 4,733,758 | 3/1988 | Duclos et al. ............. 267/140.1 X |
| 4,742,998 | 5/1988 | Schubert .................. 267/140.1 X |
| 4,757,981 | 7/1988 | Hartel . |
| 4,759,534 | 7/1988 | Hartel . |
| 4,773,632 | 9/1988 | Hartel . |
| 4,893,800 | 1/1990 | Tabata ...................... 248/562 X |

FOREIGN PATENT DOCUMENTS

60-104828 10/1985 Japan .
61-74930 4/1986 Japan .

Primary Examiner—George E. A. Halvosa
Attorney, Agent, or Firm—Lowe, Price, LeBlanc, Becker & Shur

[57] ABSTRACT

A vibration damping device disposed between a vibrating body such as an internal combustion engine and a base such as a vehicular chassis, comprises an accelerometer which is mounted on the vibrating body and detects an acceleration in the vertical direction of the vibrating body, and a control unit which controls the viscosity of rheopectic fluid within a flow restricting member disposed in the damping device in response to an acceleration signal from the accelerometer. The control unit operates in such a manner that, when the control unit receives an acceleration signal whose value is smaller than a preset value, voltage is applied to the electrodes disposed in the flow restricting member and as a result the dynamic damping effect is gained. Further the control unit operates in such a manner that, when the control unit receives a signal whose value is equal to or larger than the preset value, no voltage is applied to the electrodes and as a result the relationship between the damping force and the spring force is varied from a state in which they act in the same direction to one in which they act in opposite directions rapidly.

15 Claims, 6 Drawing Sheets

VIBRATION DAMPING DEVICE

This application is a continuation of application Ser. No. 07/266,061 filed Nov. 2, 1988, now abandoned.

BACKGROUND OF THE INVENTION

1. Field of the Invention

The present invention relates generally to a vibration damping device filled with non-Newtonian fluid which exhibits rheopectic properties. More particularly, the invention relates to an improved arrangement which permits the damping characteristics to be controlled by sensing acceleration in the vertical direction of a vibrating body which acceleration varies with the vibration of the vibrating body and which produces a suitable control signal applied to the damping member.

2. Description of the Prior Art

Recently, there have been proposed and developed various vibration damping devices which are filled with rheopectic fluid and which are capable of varying viscosity of the fluid within a passage defining fluid chambers with the result that the resonance frequency of the damping member may be selectively varied. One such vibration damping device has been disclosed in the Japanese Patent First Publication (Tokkai Showa) 60-104828. This conventional damping device is comprised of a rigid annular member on which an elastomeric member and a flexible diaphragm are supported in such a manner as to define an enclosed space which is filled with the rheopectic fluid. A partition member is interposed in the internal space to define first and second chambers. The partition member includes electrodes which are juxtaposed to each other in a fluid passage defined within the partition member. These electrodes are connected to a control circuit which selectively applies a voltage thereacross.

Figure 1:
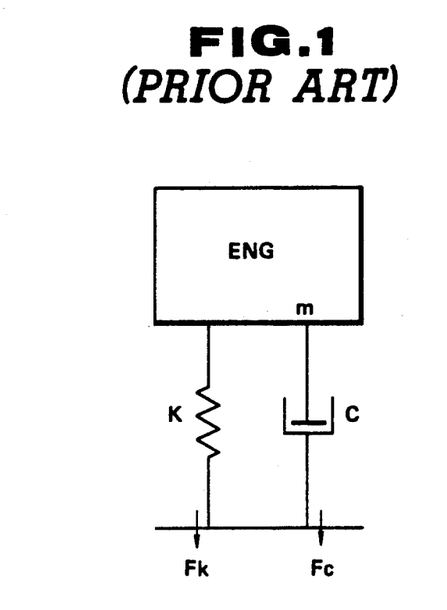
FIG. 1 is a model illustrating the arrangement of the prior art vibration damping device discussed in the opening paragraphs of the instant disclosure.

FIG. 1 is a model illustrating a system of vibrating members having a single degree of freedom, comprised of a spring K and a damper C. The spring K and damper C are juxtaposed between a vibrating body (engine) m and a base. In this model, reference numeral Fk denotes the spring force along the axis of vibration of the vibrating body and reference numeral Fc denotes the damping force of the damper C. $F_{total}$ denotes the vibrational force which is transmitted through the damping device to the base and which is equal to Fk+Fc.

Figure 2:
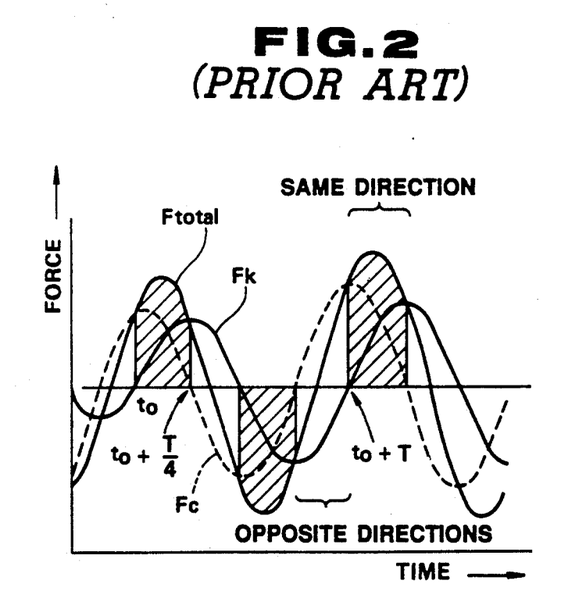
FIG. 2 is a graph showing the phase of the spring force Fk and the damping force Fc in terms of force and time.

FIG. 2 is a graph showing the relationship between the spring force Fk, the damping force Fc, and the transmitted vibrational force $F_{total}$ as shown in FIG. 1.

$t_o$ is the initial time of the measurement of the spring force Fk and T is the length of one vibration cycle measured from the initial time $t_o$.

As clearly shown in FIG. 2, the phase difference between the spring force Fk and the damping force Fc, is 90° or T/4. This is because the spring force Fk is proportional to the displacement of the sprung mass and the damping force Fc is proportional to the velocity of the sprung mass. In such a system, it is easy to calculate the damping force at any given moment.

In damping devices wherein a fluid is arranged to flow through a fluid passage between the first and second chambers, the flow of fluid induces expansion of an elastomeric and a flexible diaphragm in such a manner that the resilience of the members defining the first and second chambers has the effect of an expansion spring. The phase relationship between the spring force and the expansion spring force in such devices is complex and difficult to calculate. If the flow resistance of the passage between the respective chambers is changed, the resonance frequency of the expansion spring changes, still further complicating the phase relationship between the spring force and the expansion spring force, making it difficult to calculate the fluid passage resistance that will produce the optimum damping effect.

SUMMARY OF THE INVENTION

In view of the above, it is an object of the present invention to provide an electronically controllable vibration damping device which is effective over a wide range of frequencies and whose damping force is so controlled as to lower the sum of the damping force and the spring force transmitted between the sprung mass and non sprung mass.

In brief, the above object is achieved by an arrangement wherein an accelerometer is mounted on the vibrating body and detects acceleration in the vertical direction of the vibrating body, and a control unit which controls the viscosity of rheopectic fluid, within a flow restricting member in the damping device, in response to an acceleration signal from the accelerometer. The control unit operates in such a manner that, when the control unit receives an acceleration signal whose value is smaller than the preset value, voltage is applied to electrodes disposed in the flow restricting member and as a result a dynamic damping effect is gained. Further the control unit operates in such a manner that, when the control unit receives a signal whose value is equal to or larger than the preset value, no voltage is applied to the electrodes and as a result the phase relationship between the damping force and the spring force varies rapidly.

According to one aspect of the invention, a vibration damping device interposed between a vibrating body and a base comprises a spring element disposed between the vibrating body and the base, a partition member which has a plurality of orifices comprising electrodes and defines a plurality of fluid chambers which communicated with each other through fluid passages defined by the plurality of orifices, a flexible diaphragm hermetically connected to an end of either of the plurality of fluid chambers, a rheopectic fluid disposed in said plurality of fluid chambers and the fluid passages, said rheopectic fluid exhibiting rheopectic properties, and means for selectively applying voltage to the electrodes in accordance with acceleration or displacement of the vibrating body. The spring element comprises an elastomeric member. The rheopectic fluid, the elastomeric body, and the flexible diaphragm act as a dynamic damping mechanism in response to vibration of the vibrating body. The damping force of the dynamic damping mechanism is controlled by varying the viscosity of the rheopectic fluid by selectively applying voltage through the means. The plurality of orifices are coaxially arranged.

According to another aspect of the invention, a vibration damping device interposed between a vibrating body and a base comprises first means for elastically connecting the vibrating body and the base, second means disposed hermetically to cover an opening of the first means, third means for dividing an internal space defined by inner walls of the first means and second means into a first chamber and a second chamber, the third means having a plurality of orifices through which the first chamber communicates with the second chamber, the plurality of orifices acting as a plurality of electrodes, a rheopectic fluid whose viscosity can be varied by applying voltage thereto, the fluid is disposed in the first and second chambers and the plurality of orifices, control means for selectively applying voltage to the electrodes in accordance with acceleration or displacement of the vibrating body. The voltage is applied to the orifices when a value of the acceleration or displacement is smaller than a predetermined threshold value and no voltage is applied to the orifices when the value of the acceleration or displacement is equal to or larger than the predetermined threshold value. The control means comprises an accelerometer which is mounted on the vibrating body and outputs an acceleration signal, a control circuit which compares the value of said acceleration or displacement derived from the acceleration signal with the predetermined threshold value and outputs a control signal to a power source, thereby selectively applying voltage to the orifices. The predetermined threshold value can be changed in response to the maximum absolute value of the acceleration. The first means comprises a first bracket detachably secured to the vibrating body, a second bracket detachably secured to the base and an elastomeric body elastically connecting the first and second brackets. The second means comprises a flexible diaphragm which is elastically expandable or a piston which is slidable along the inner periphery of the opening and is sprung by a spring whose end is connected to the base. The third means comprises a partition member.

In a further aspect of the invention, a vibration damping device interposed between a vibrating body and a base comprises a pair of brackets detachably secured to the vibrating body and the base, respectively, an elastic member for elastically connecting the vibrating body and the base, the elastic member hermetically connected to the vibrating body and the base so as to define an internal space between the elastic member and the pair of brackets, a partition member for dividing the internal space into first and second chambers, the partition member having a plurality of orifices through which the first chamber communicates with the second chamber, the plurality of orifices acting as a plurality of electrodes, a flexible diaphragm disposed in the internal space, the peripheral surface of the diaphragm hermetically connected to an end of either of the first and second chambers, the diaphragm being elastically expandable, a rheopectic fluid whose viscosity can be varied by applying voltage thereto, the fluid is disposed in the first and second chambers and the plurality of orifices, an accelerometer mounted on the vibrating body so as to detect acceleration of the vibrating body, and a control circuit for controlling the viscosity within the orifices in response to an acceleration signal from the accelerometer, the control circuit operating in such a manner that, when a value of the acceleration or displacement is smaller than a predetermined threshold value, voltage is applied to the electrodes and when the value of the acceleration or displacement is equal to or larger than the predetermined threshold value, no voltage is applied to the electrodes.

DESCRIPTION OF THE PREFERRED EMBODIMENT

Figure 4:
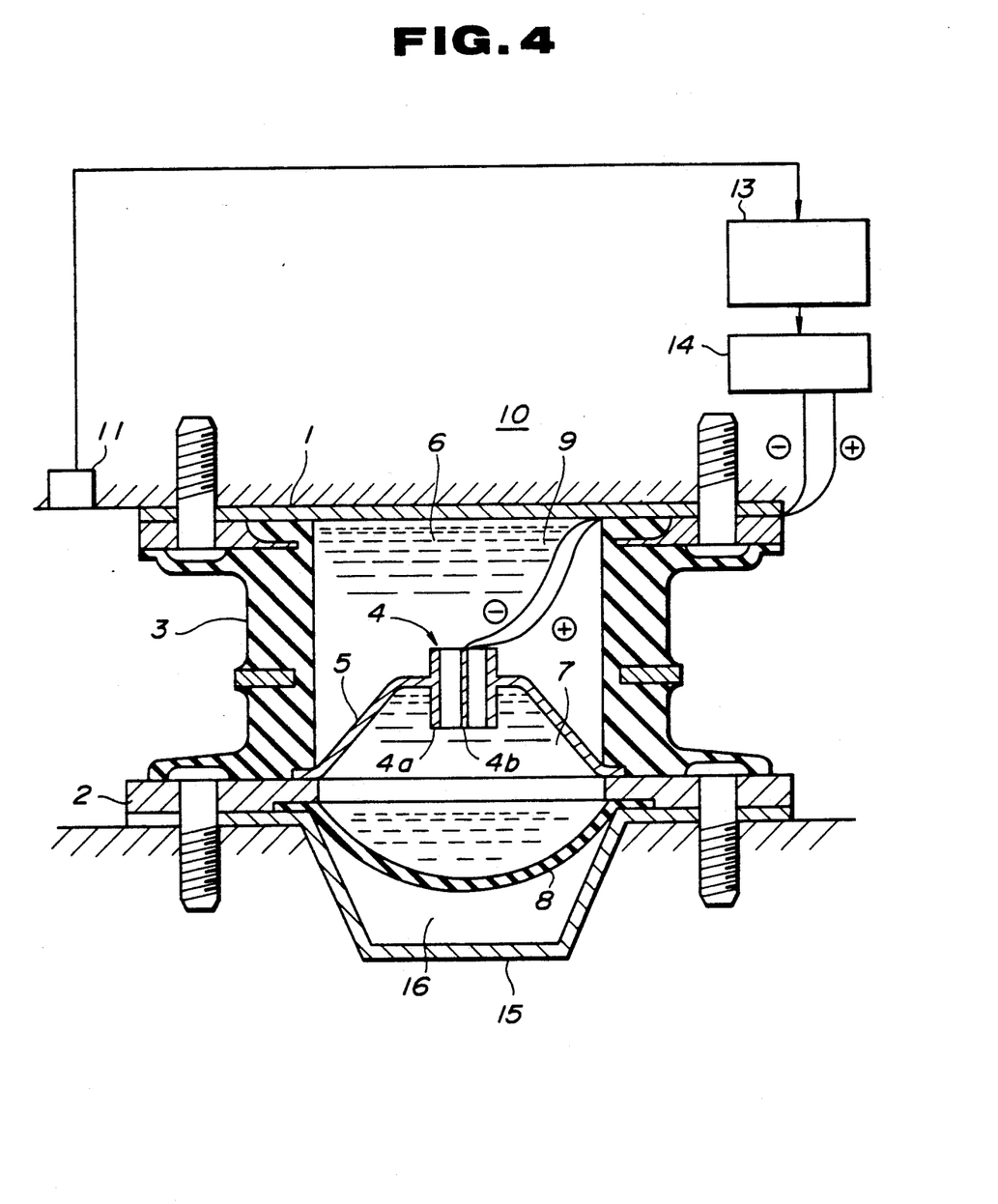
FIG. 4 is a sectional view showing the construction of the embodiment of the invention.

Referring now to the drawings, particularly to FIG. 4, there is shown an improved vibration damping device 10 whose damping force can be varied on the basis of acceleration of a vibrating body, such as an internal combustion engine.

The vibration damping device 10 can be used for an engine mount of a vehicle. The engine mount 10 comprises an elastomeric member 3 interposed between an upper bracket 1 which is rigidly connected to the vibrating body and a lower bracket 2 which is connected to a base such as a chassis of the vehicle, a partition member 5 which is juxtaposed to the elastomeric member 3 and has a flow restricting member or orifice 4, and a flexible diaphragm 8 whose outer peripheral surface is interleaved between the lower bracket 2 and a bottom lid 15 so as to form a hermetic seal. The lower bracket 2 and the bottom lid 15 are firmly secured to the base by means of bolts. An air chamber 16 is defined between the diaphragm 8 and the bottom lid 15. An internal space is also defined between the upper bracket 1, the elastomeric member 3, and the diaphragm 8. The internal space is divided by the partition member 5 into a first fluid chamber 6 and a second fluid chamber 7. A rheopectic fluid 9 is disposed in the first and second chambers 6, 7 and the flow restricting member 4. In this construction, relative movement between the sprung and non-sprung members causes deformation of the elastic member 3. When the elastic member 3 is compressed, the volume of the first chamber 6 is effectively decreased thus forcing the rheopectic fluid, which is essentially non-compressible, to flow through the orifice 4 into the second chamber 7. Damping is achieved by flow resistance of the orifice 4 which is controllable.

An acceleration sensor 11 which detects acceleration in the vertical direction of the vibrating body, is mounted on the vibrating body. An acceleration signal from the sensor 11 is received by a control unit 13 and is processed therein. After this process, the control unit outputs a control signal to a power source 14. The positive and negative terminals of the power source 14 are connected respectively to a positive electrode 4a which is arranged in the peripheral portion of the flow restricting member 4 and a negative electrode 4b which is arranged in the center of the member 4. The surfaces of two electrodes are treated with gold or platinum so as to avoid electrolysis. In this construction, when voltage is applied across the positive and negative electrodes 4a and 4b, the rheopectic fluid 9 exhibits an increase in viscosity (Winslow effect).

The control of viscosity of the fluid 9 will be described in detail in accordance with the steps executed by the algorithm shown in FIG. 5:

First, the acceleration $\ddot{X}_1$ in the vertical direction of the engine is detected by the acceleration sensor 11.

Next, the absolute value $|\ddot{X}_1|$ of the acceleration $\ddot{X}_1$ is calculated;

The absolute value $|\ddot{X}_1|$ is compared with a preset threshold value $\ddot{X}_0$. When the absolute value is smaller than the preset value, the control unit 13 outputs the control signal to the power source in such a manner that voltage is applied across the electrodes. Conversely, when the absolute value is equal to or larger than the preset value, the control unit 13 outputs the control signal indicating that no voltage is applied across the electrodes.

Figure 5:
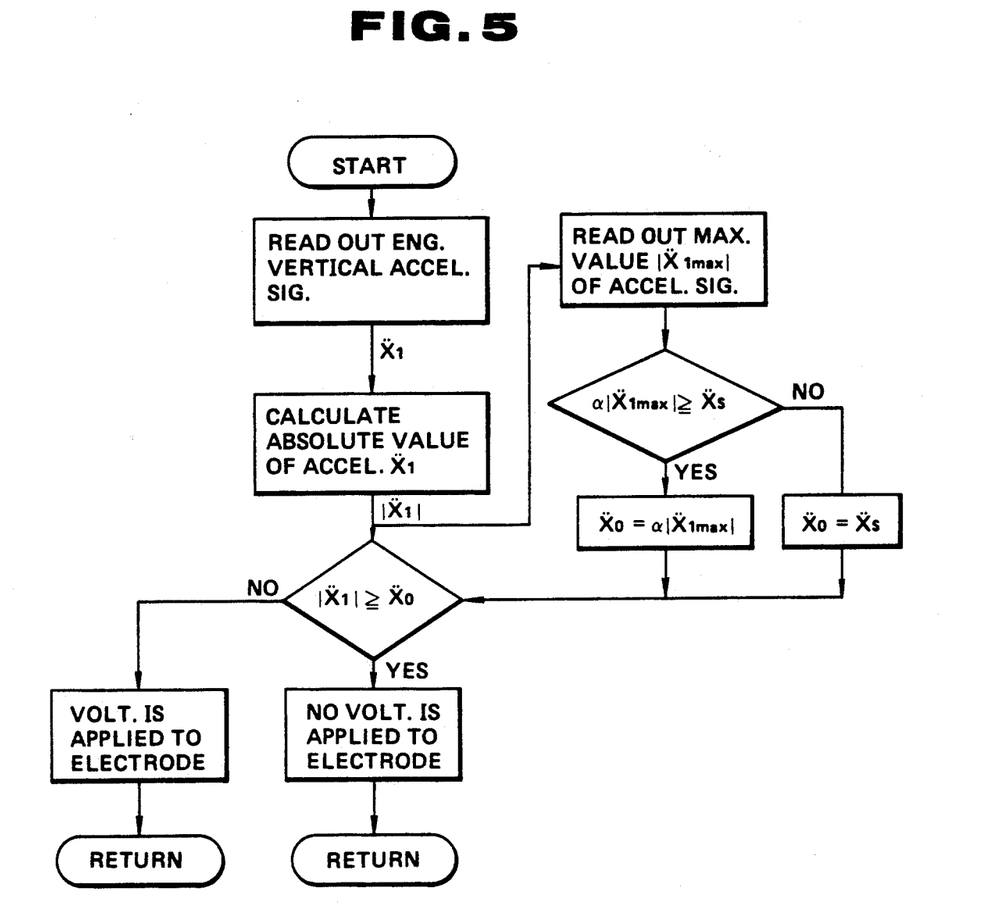
FIG. 5 is a flow chart showing the steps which are executed by algorithm according to the invention.

The preset threshold value $\ddot{X}_0$ can be reset in accordance with the flow chart shown in the right-hand of FIG. 5. This reset operation is performed as follows:

First, the absolute value $|\ddot{X}_1|$ are read out for a short period of time, and the maximum value $|\ddot{X}_{1max}|$ is determined;

The maximum acceleration $|\ddot{X}_{1max}|$ is multiplied by a control factor $\alpha (0<\alpha<1)$ and as a result, a control value $\alpha |\ddot{X}_{1max}|$ is produced;

The control value $\alpha |\ddot{X}_{1max}|$ is compared with a predetermined minimum threshold value $\ddot{X}_s$. When the control value is smaller than the minimum value $\ddot{X}_s$, the preset value $\ddot{X}_0$ is reset to the minimum value $\ddot{X}_s$. When the control value is equal to or larger than the minimum value $\ddot{X}_s$, the preset value $\ddot{X}_0$ is reset to the control value $\alpha |\ddot{X}_{1max}|$. In this manner, the preset value $\ddot{X}_0$ can be changed in response to the vibrational state of the engine.

Figure 6:
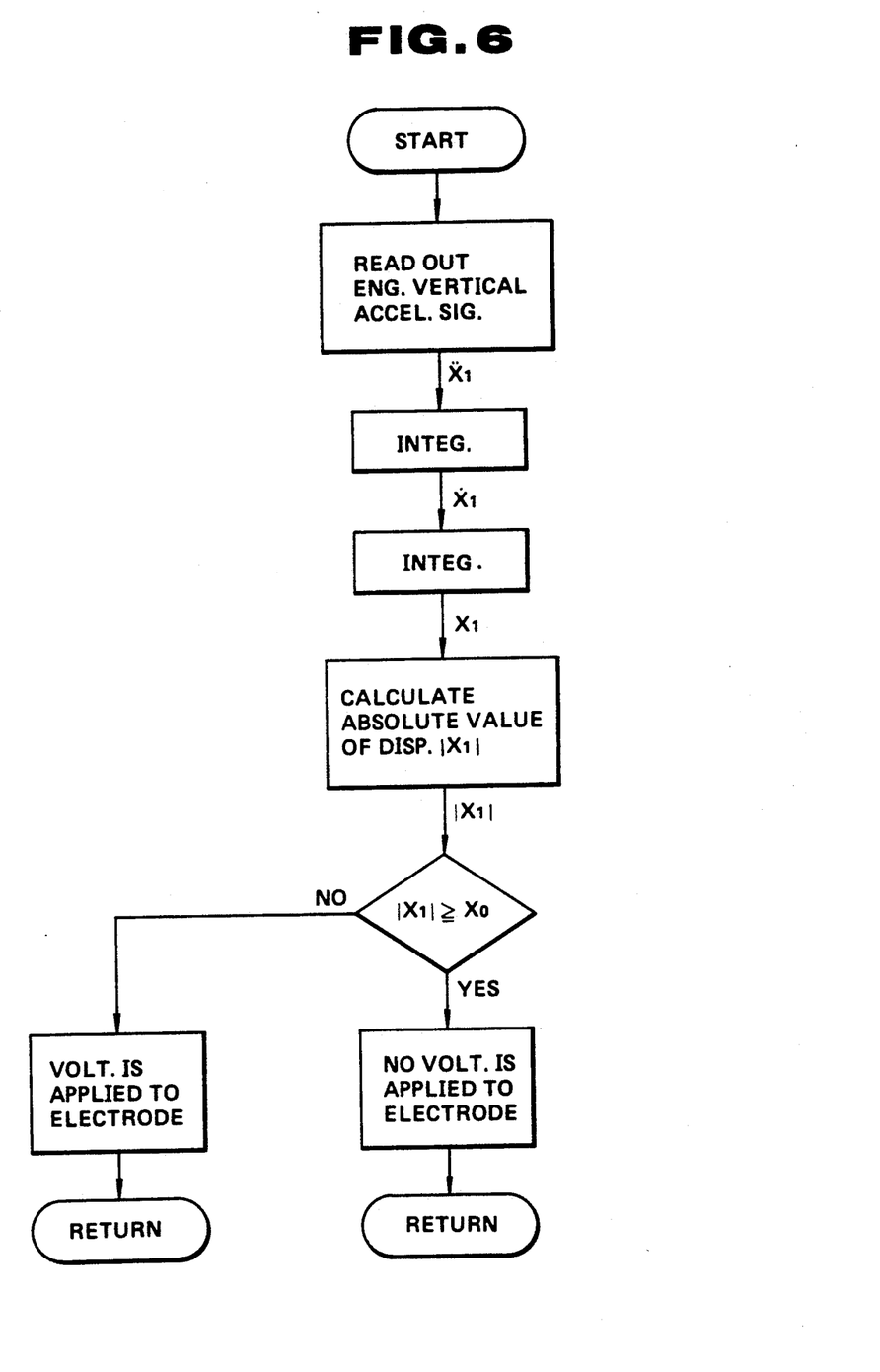
FIG. 6 is a flow chart showing the steps which are executed by another algorithm according to the invention.

Another control operation for controlling the viscosity of the fluid 9 will be described in detail in accordance with the steps executed by an algorithm shown in FIG. 6:

First, the acceleration $\ddot{X}_1$ in the vertical direction of the engine is read out by the acceleration sensor 11;

Next, velocity $\dot{X}_1$ of the engine in the vertical direction is deduced by a first integrator;

Subsequently, vertical displacement $X_1$ of the engine is deduced by a second integrator and after this, the absolute value $|X_1|$ of the vertical displacement $X_1$ is produced;

The absolute value $|X_1|$ is compared with a preset value $X_0$. When the absolute value is smaller than the preset value $X_0$, the control unit 13 outputs the control signal to the power source 14 in such a manner that voltage is applied to the electrodes. Conversely, when the absolute value is equal to or larger than the preset value $X_0$, the control unit 13 outputs the control signal to the power source 14 in such a manner that no voltage is applied to the electrodes. Similarly, the damping device is controlled on the basis of the acceleration in the vertical direction of the engine.

When controlled according to the above control operation, the damping device 10 of the invention is effective to dampen vibration in the manner described below.

Figure 7:
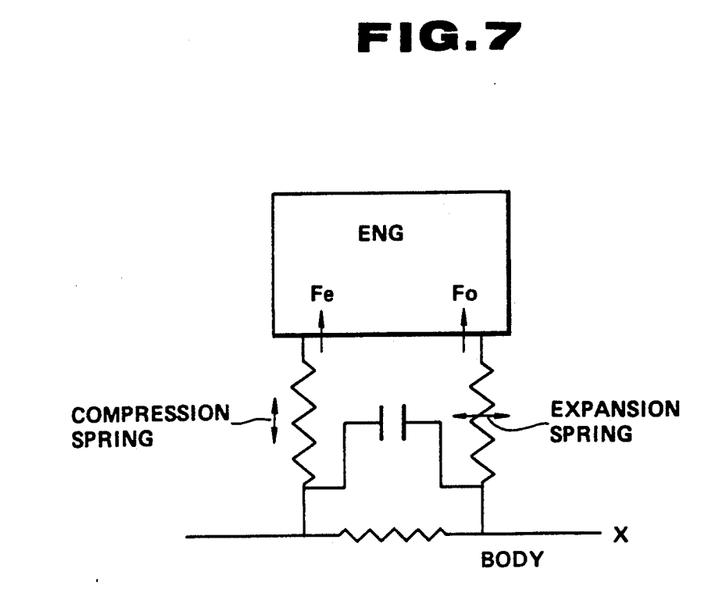
FIG. 7 is a schematic illustration of the embodiment according to the invention.

The vibrational system of the damping device 10 can be essentially represented by the model as shown in FIG. 7. This system comprises a compressive spring and an expansion spring. Fe is a vertical spring force corresponding to the compression spring force which is induced by input vibration from the engine. Fo is an expansion spring force which is generated by fluid flow of the rheopectic fluid in the fluid chambers 6, 7 and the flow restricting member 4 due to input vibration from the engine. One end of two springs are connected to the vibrating body (engine). While the other end of the springs is connected to the base (chassis).

Figure 8:
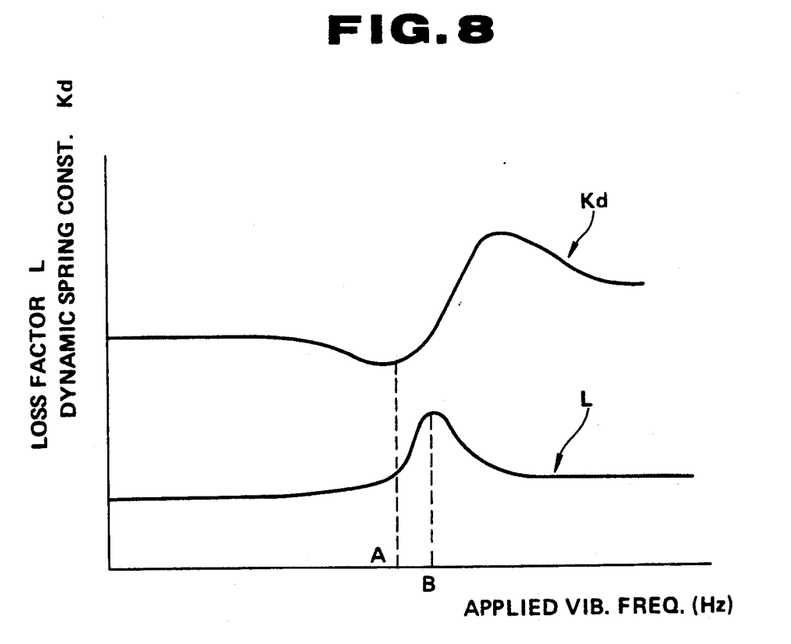
FIG. 8 is a graph showing the changes in the dynamic spring constant Kd and the loss factor L which are produced according to the invention.

As shown in FIG. 8, this vibrational system has the following effects:

The dynamic spring constant Kd becomes lower in the vicinity of a slightly lower frequency A than at the resonance frequency B;

The loss factor L becomes greatest in the resonance frequency B and as a result this system exhibits a dynamic damping effect in the resonance frequency B.

As set forth above, this vibrational system according to the invention cannot be depicted as a model having a single degree of freedom. Below the resonance frequency of the damping device 10, the phase difference between the compression spring force Fe and the expansion spring force Fo is approximately 180°. On the other hand, above the resonance frequency of the damping device 10, the phase difference is approximately 0°. Thus, the phase relationship between the compression spring force Fe and the expansion spring force Fo varies between same phase and reverse phase over time. The absolute value of sum $|F_{total}|$ of the compression spring force Fe and the expansion spring force Fo can be expressed:

$$|F_{total}| = |Fe + Fo|$$

When the compression spring force Fe and the expansion spring force Fo are in the same direction, the vibrational force $|F_{total}|$ which is transmitted through the damping device 10 to the base such as a vehicular body or chassis, becomes large and therefore the acceleration of the upper bracket 1 is great. Under such a condition, the value of the acceleration signal from the sensor exceeds the preset value. Therefore, in the damping device according to the invention, the voltage across the electrodes is cut in response to the control signal from the control unit 13 and as a result the viscosity of the rheopectic fluid within the flow restricting member 4 is decreased. As a result, the damping coefficient of the damping device 10 is decreased. That is to say, since the flow resistance of the flow passage defined in the flow restricting member 4 is decreased, the fluid becomes free to flow with the result that the damping resistance is decreased and therefore the sum of the transmitted force is temporarily decreased.

On the other hand, when the compression spring force Fe and the expansion spring force Fo are in opposite directions, the vibrational force $|F_{total}|$ is attenuated. At this time, since the value of acceleration signal is smaller than the preset value, voltage is applied across the electrodes in response to the control signal from the control unit 13 and as a result the viscosity of the rheopectic fluid within the flow restricting member 4 is increased. As a result, the damping coefficient of the damping device 10 is increased. That is to say, since the flow resistance of the flow passage is increased, the flow of the fluid is restricted by the flow restricting member 4 with the result that the loss factor L of vibrational energy is increased. In this manner, the vibrational energy is effectively attenuated.

As will be appreciated from the above, the damping device is controlled in a manner that the damping force is decreased when the compression spring force and the expansion spring force are acting in the same direction, conversely the damping force is increased when they are acting in opposite directions. This prevents amplification of the two spring forces. In addition, the damping device according to the invention has a dynamic damping effect in reverse-phase condition of the two spring forces.

Figure 3:
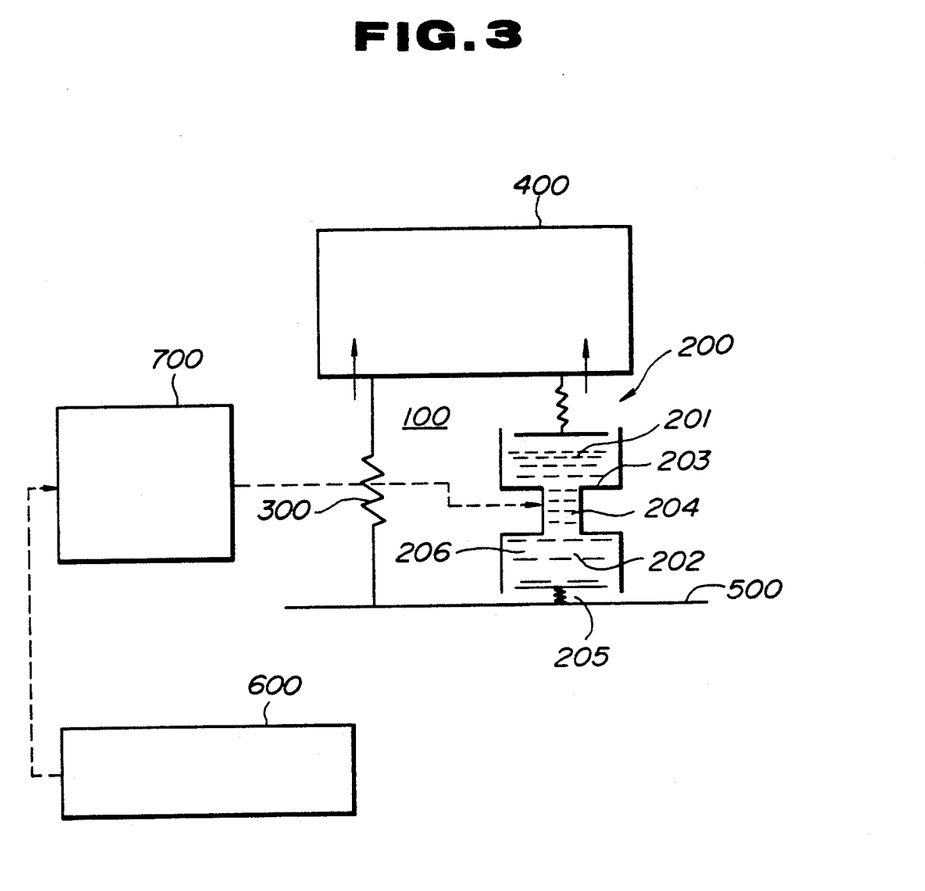
FIG. 3 is a schematic representation of the arrangement of an embodiment of the invention.

The arrangement of the present embodiment will be described in accordance with FIG. 3.

Reference numeral 100 denotes the damping device according to the invention. The damping device comprises a damper 200 which includes a first fluid chamber 201, a second fluid chamber 202, a partition member 203 and a compressive spring 300. A plurality of electrodes 204 which act as flow restricting members are disposed in the partition member 203. Also, a flexible diaphragm 205 is located in the bottom of the second fluid chamber 202. A rheopectic fluid 206 which exhibits rheopectic properties is, provided in the first and second chambers 201 and 202 and the partition member 203.

The damping device 100 is interposed between a vibrating body 400 such as an engine and a base 500 such as a chassis.

Reference numeral 600 denotes an accelerometer which is mounted on the vibrating body 400. Reference numeral 700 denotes a control unit receiving an acceleration signal outputted from the accelerometer 600.

In this construction, when the control unit 700 receives an acceleration signal whose value is smaller than the preset value, that is, the damping force and the spring force are in opposite directions, voltage is applied to the plurality of electrodes 204 and as a result the dynamic damping effect is gained. On the other hand, when the control unit 700 receives a value of the signal equal to or larger than the preset value, that is, the damping force and the spring force are acting in the same direction, no voltage is applied to the electrodes 204 and as a result the relationship between the damping force and the spring force changes between acting in unison and acting in opposite directions rapidly. In this manner, the vibrational energy from the vibrating body 400 is effectively attenuated by the vibrational system according to the damping device 100 of the invention.

Although the preferred embodiment of the invention has been disclosed in terms of an electronically controllable vibration damping device which serves as an engine mount of a vehicle. It is not intended to limit the scope of the invention to such a device. For example, the damping device may serve in the suspension of a vehicle. The invention may be embodied in other specific forms without departing from the spirit or essential characteristics thereof.

What is claimed is:

1. A vibration damping device interposed between a vibrating body and a base comprising:

a spring member disposed between said vibrating body and base, said spring member being elastically operable in a vibrational direction of said vibrating body and expandable in a direction perpendicular to said vibrational direction;

a partition member which has at least one orifice including electrodes and defines a plurality of fluid chambers communicating with each other through at least one fluid passage defined by said at least one orifice;

a flexible diaphragm hermetically connected to an end of one of said plurality of fluid chambers;

a rheopectic fluid mass disposed in said plurality of fluid chambers and said at least one fluid passage, said rheopectic fluid exhibiting rheopectic properties;

said elastic spring member generating a first spring force created by an elastic force acting in said vibrational direction and a second spring force created by an inertia force of said fluid mass acting in said expandable direction;

means mounted on said vibrating body for monitoring acceleration thereof, said monitoring means producing a signal representative of said acceleration and which signal is thereby representative of whether said first and second spring forces act in opposite directions to each other;

means for processing said acceleration signal to derive the acceleration or displacement of said vibrating body;

means for comparing the value of acceleration or displacement from said processing means with a predetermined threshold value, said comparing means producing a command signal indicating that the acceleration or displacement is less than said threshold value; and means for selectively applying voltage to said electrodes in response to said command signal.

2. A vibration damping device as set forth in claim 1, wherein said spring member comprises an elastomeric body.

3. A vibration damping device as set forth in claim 2, wherein said fluid, said elastomeric body, and said flexible diaphragm act as a dynamic damping mechanism in response to vibration of said vibrating body.

4. A vibration damping device as set forth in claim 3, the damping force of said dynamic damping mechanism is controlled by varying the viscosity of the rheopectic fluid by selectively applying voltage through said electrodes.

5. A vibration damping device as set forth in claim 1, further including a plurality of said orifices being coaxially arranged.

6. A vibration damping device interposed between a vibrating body and a base comprising:

first means for elastically connecting said vibrating body and base, said first means being elastically operable in a vibrational direction of said vibrating body and expandable in a direction perpendicular to said vibrational direction;

second means disposed hermetically to cover an opening of said first means, said second means being flexible and expandable;

third means for dividing an internal space defined by inner walls of said first means and second means into first and second chambers, said third means having at least one orifice through which said first chamber communicates with said second chamber;

said at least one orifice acting as a plurality of electrodes;

a rheopectic fluid whose viscosity can be varied by applying voltage thereto, said fluid disposed in said first and second chambers and said at least one orifice;

sensor means mounted on said vibrating body to monitor an acceleration thereof, said sensor means producing a signal representative of said acceleration;

means for processing said acceleration signal to derive the acceleration or displacement of said vibrating body;

means for comparing the value of acceleration or displacement from said processing means with a predetermined threshold value, said comparing means producing a command signal indicating that the acceleration or displacement is less than said threshold value; and control means for selectively applying voltage to said electrodes in response to said command signal to rapidly damp the vibration of said vibrating body on the basis of the acceleration or displacement of said vibrating body.

7. A vibration damping device as set forth in claim 6, further including means for changing said predetermined threshold value in response to a maximum absolute value of said acceleration.

8. A vibration damping device as set forth in claim 6, wherein said first means comprises a first bracket detachably secured to said vibrating body, a second bracket detachably secured to said base, and an elastomeric body elastically connecting said first and second brackets.

9. A vibration damping device as set forth in claim 8, said second means comprises a flexible diaphragm which is elastically expandable or a piston which is slidable along the inner periphery of said opening and is sprung by a spring whose end is connected to said base.

10. A vibration damping device as set forth in claim 9, said third means comprises a partition member.

11. A vibration damping device as set forth in claim 10, wherein said fluid, said elastomeric body, and said flexible diaphragm act as a dynamic damping mechanism in response to vibration of said vibrating body.

12. A vibration damping device as set forth in claim 11, the damping force of said dynamic damping mechanism is controlled by varying the viscosity of the rheopectic fluid by selectively applying voltage through said control means.

13. A vibration damping device as set forth in claim 6, said plurality of electrodes are coaxially arranged.

14. The vibration damping device as set forth in claim 6, wherein said sensor means includes an accelerometer mounted on said vibrating body.

15. A tunable vibration damping device interposed between a vibrating body and a base comprising:

elastic means disposed between said vibrating body and base, said elastic means being elastically operable in a vibrational direction of said vibrating body and expandable in a direction perpendicular to said vibrational direction, and elastic means defining an internal space therein;

orifice means disposed in said internal space to define a plurality of fluid chambers in conjunction with the inner wall of said elastic means, said orifice means including a plurality of electrodes spaced from each other to define a plurality of fluid passages between the adjacent electrodes, said fluid passages interconnecting said fluid chambers with each other;

an expandable flexible diaphragm for suspending fluid, said diaphragm hermetically connected to an end of either of said fluid chambers in a fluid tight manner;

a rheopectic fluid disposed in said fluid chambers and fluid passages to provide a variable damping effect in conjunction with said elastic means, orifice means, and diaphragm;

said elastic means generating a first spring force created by an elastic force acting in said vibrational direction and a second spring force created by an inertia force of said fluid mass acting in said expandable direction;

means mounted no said vibrating body to monitor an acceleration thereof, said monitoring means producing a signal representative of said acceleration;

means for processing said acceleration signal to derive the acceleration or displacement of said vibrating body;

means for determining that said first and second spring forces act in the opposite direction and for producing a command signal when the acceleration or displacement is less than a predetermined threshold value; and means for selectively applying voltage to said electrodes in response to said command signal.

* * * * *